J. SMITH.
ADJUSTABLE SPRING SEAT PILLAR AND SADDLE SUPPORT FOR MOTOR CYCLES.
APPLICATION FILED DEC. 10, 1912.
1,092,407.
Patented Apr. 7, 1914.
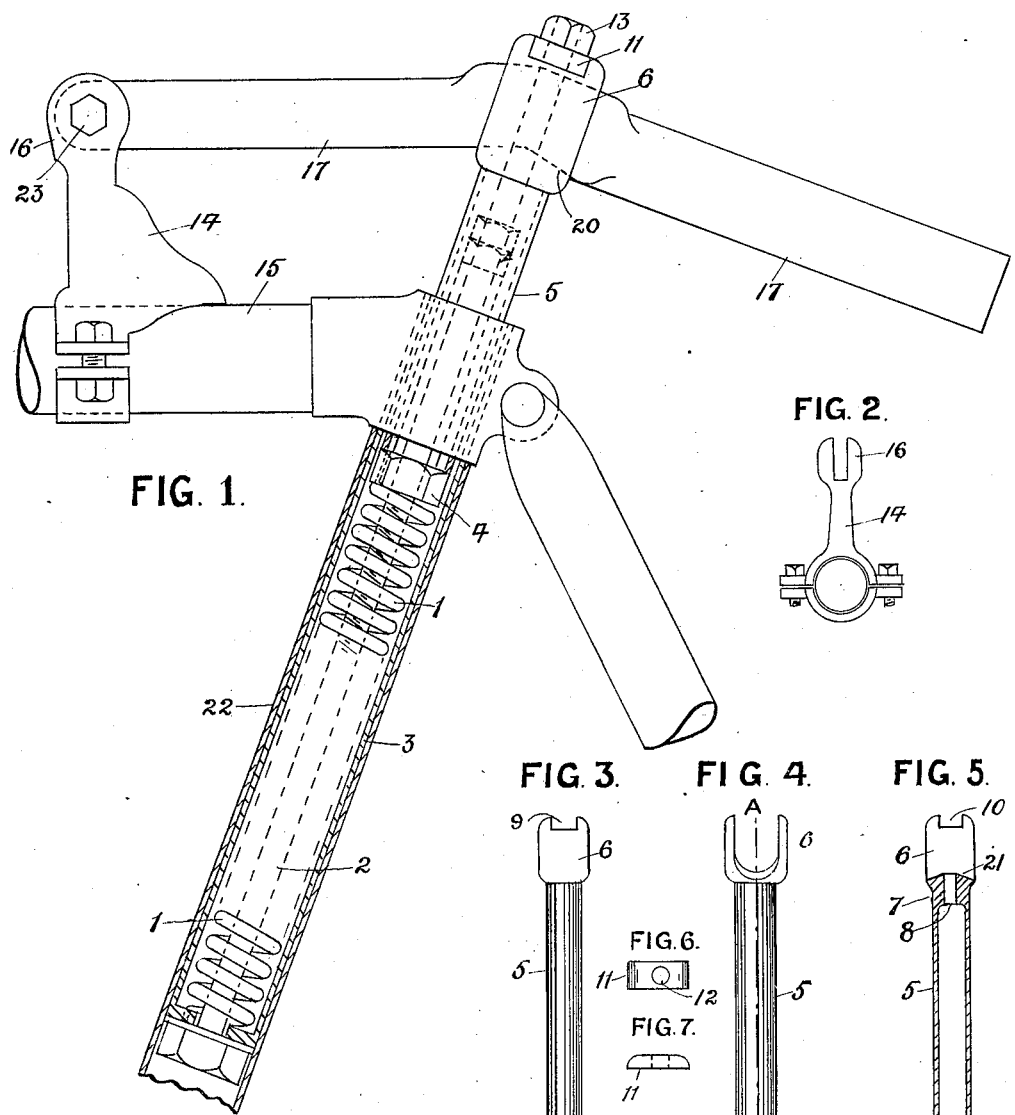

UNITED STATES PATENT OFFICE.

JOSEPH SMITH, OF MANCHESTER, ENGLAND.

ADJUSTABLE-SPRING SEAT-PILLAR AND SADDLE-SUPPORT FOR MOTOR-CYCLES.

1,092,407.

Specification of Letters Patent.

Patented Apr. 7, 1914.

Application filed December 10, 1912. Serial No. 736,013.

*To all whom it may concern:*

Be it known that I, JOSEPH SMITH, subject of the King of Great Britain, residing at 64 Lower Broughton road, Salford, Manchester, England, have invented new and useful Improvements in Adjustable-Spring Seat-Pillars and Saddle-Supports for Motor-Cycles, of which the following is a specification.

This invention relates to improvements in the construction of adjustable spring seat pillars and saddle supports for motor cycles the object of which is to insure the rider always being perfectly balanced over the spring and at the same time make it practically impossible to develop side shake and also enable the adjustment of the spring, to suit the weight of the rider, to be easily accomplished.

The invention is illustrated on the accompanying drawings in which:—

Figure 1 is a part sectional side view of a portion of the frame of a cycle with my improvements attached thereto in position. Fig. 2 is a front view of one of the fittings. Fig. 3 is a side view of the inner tube which supports the saddle tube. Fig. 4 is a front view of Fig. 3. Fig. 5 is a section of Fig. 4 taken on the line A—B. Fig. 6 is a plan of a bridge piece. Fig. 7 is a side elevation of Fig. 6. Fig. 8 is an inverted plan of the saddle supporting tube. Fig. 9 is a top plan view of Fig. 8.

In carrying this invention into practice the spring 1, through which the left handed screw spindle 2, for adjusting the tension on the spring, passes, is held in the tube 3 by the lower projecting end of the spring fitting into a slot in the bottom portion of said tube 3 and the upper projecting end in to a slot in the adjusting nut 4 which screws on to the spindle 2, or in any other suitable manner. The inner tube 5, which is made to slide easily in the tube 3, is provided with a U shaped upper extremity 6 and is formed with a solid part 7 through which a hole 8 is drilled to permit the upper portion of the screw-threaded spindle 2 to pass through. Two slots 9 and 10 are made in the sides of the U extremity 6 into which a bridge piece 11 fits, the upper end of the screw-threaded spindle 2 passing through a hole 12 in said bridge piece and being held rigid by a nut 13. A bracket 14 is fixed upon the top tube or stay 15 of the cycle and is provided with jaws 16 between which one end of the saddle supporting tube or rod 17 is hinged. This tube or bar 17 has a bearing or rests in the U part 6 of the tube 5 as seen in Fig. 1 and is provided with slots 18 and 19 through which the screw-threaded spindle 2 passes, the one slot 18 on the underneath part being shorter than the top one 19. The tube or bar 17 is also provided with a nose or incline 20 which bears against a similar incline 21 made on the bottom of the U portion 6.

The mode of putting the parts together is as follows: The screw-threaded spindle and spring being secured in their tube are then inserted in the tube or stay 21 of the cycle as shown in Fig. 1, the tube 5 is placed in position the spindle projecting slightly above its U-shaped upper end 6. The saddle supporting tube or rod 17 is then placed in position the screw-threaded spindle going through the slots 18 and 19, the fore end of the tube 17 is placed between the jaws 16 on the fitting 14 and hinged there by means of a set screw 23 and nut. The bridge piece 11 is then placed across the U piece 6 lying in the slots 9 and 10, the screw-threaded spindle projecting through it and is secured by a nut 13. The saddle is fixed upon the rear end of the tube or rod 17 and upon any weight or pressure being applied from any cause the nose or incline part 20 will bear upon its inclined seating on the bottom of the U shaped part 6 of the tube 5 forcing it down and so compressing the spring at the same time thrusting it forward slightly so that it shall not grind against the side of the tube 22. To adjust the tension on the spring it is necessary to take the set screw 23 out of the hinged part on the bracket 14, tilt the tube or rod 17 upward until clear of the jaws 16 and turn to the right to tighten and to the left to slacken the tension.

What I claim as my invention and wish to secure by Letters Patent is:—

1. In spring seat pillars and saddle supports for motor cycles a tube having a U shaped upper end, an inclined bearing surface on the base of said U shaped portion, a yielding support for said tube, a saddle support having a correspondingly inclined bearing surface fitting in said U shaped portion, and means for holding said saddle support in said U-shaped portion, said saddle support being hinged at the front end to a bracket mounted on the top tube of the cycle frame, as set forth.

2. In spring seat pillars and saddle supports for motor cycles a tube having a U shaped upper end, an inclined bearing surface on the base of said U shaped portion, a saddle support having a correspondingly inclined bearing surface fitting in said U shaped portion, a bracket mounted on the top rail of the cycle to which the front end of said saddle support is hinged, a bridge piece fitting in slots in the extremities of the U shaped portion, a tube containing a spring in the upper end of which tube the U shape ended tube fits, a spindle passing through the whole of said parts for holding said parts together, a nut, by which the upper end of said spring is held, interposed between said spring and the U shape headed tube for adjusting the tension of the spring as set forth.

In testimony whereof I have signed my name to this specification in the presence of two subscribing witnesses.

JOSEPH SMITH.

Witnesses:
H. W. DENTON INGHENY,
HERBERT D. JAMESON.

---

Copies of this patent may be obtained for five cents each, by addressing the "Commissioner of Patents, Washington, D. C."